McC. Young, Jr.
Harvester Rake.
Nº 24598    Patented Jun. 28, 1859.
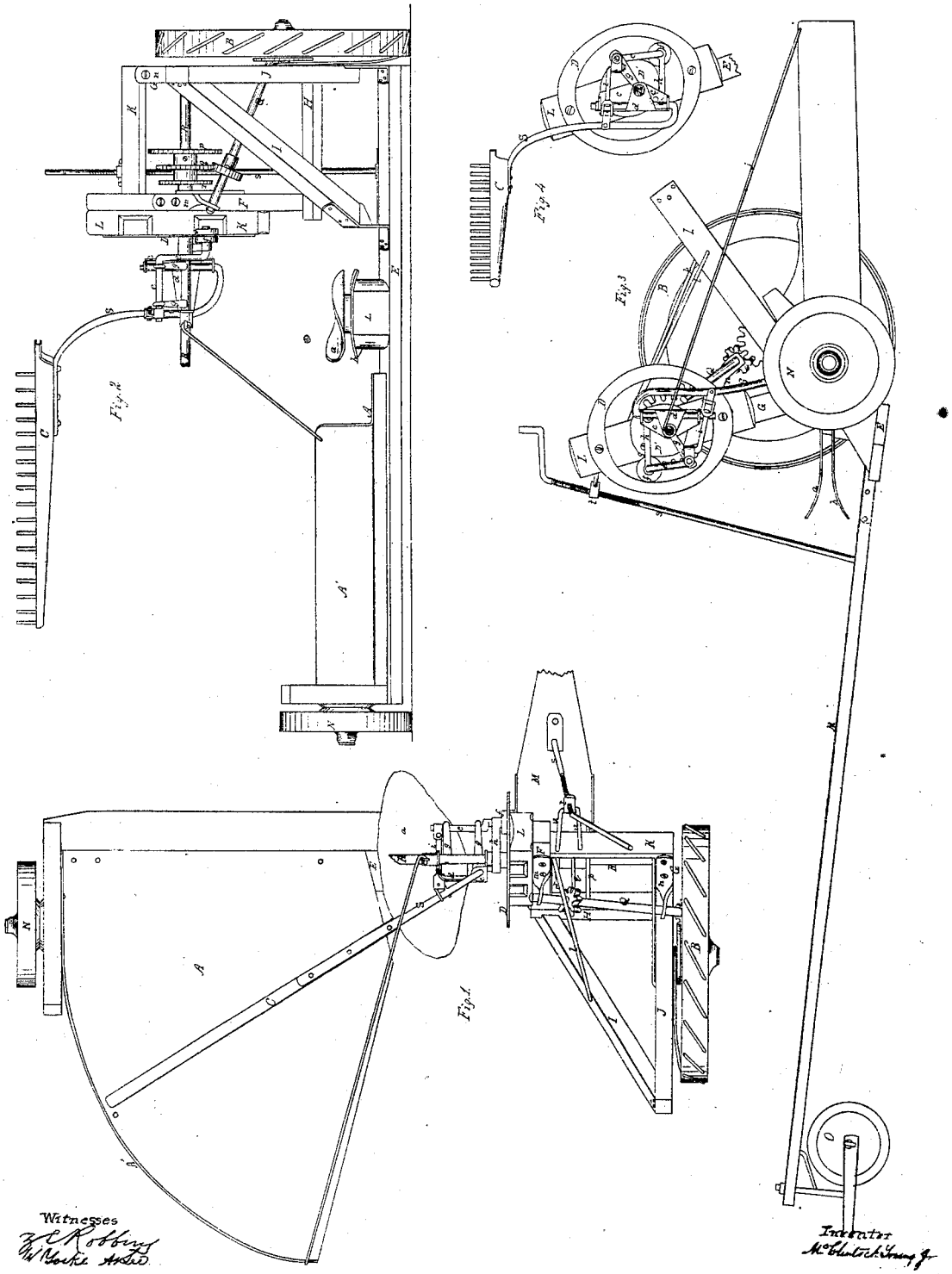

ND.

UNITED STATES PATENT OFFICE.

McCLINTOCK YOUNG, JR., OF FREDERICK, MARYLAND.

IMPROVEMENT IN HARVESTING-MACHINES.

Specification forming part of Letters Patent No. 24,598, dated June 28, 1859.

*To all whom it may concern:*

Be it known that I, McCLINTOCK YOUNG, Jr., of the city and county of Frederick, and State of Maryland, have invented a new and useful Improvement in Harvesting-Machines; and I do hereby declare that the following is a full and exact description thereof, reference being had to the accompanying drawings, making a part of this specification.

Figure 1 is a top view of my improved harvesting-machine; Fig. 2, a rear elevation of the same; Fig. 3, a side view, and Fig. 4 a view of the novel portion of said machine detached from the other parts thereof.

Similar letters indicate like parts in each of the drawings.

The frame of my improved harvesting-machine may be constructed by properly uniting to each other the respective parts E F G H I J K L, (represented in the accompanying drawings;) or the said frame may be constructed by uniting any other suitable materials with each other.

The improvement which I now desire to secure by Letters Patent consists in combining the handle S of a rake, C, with a transverse shaft, R, by means of a new combination of mechanism, which is so arranged that the rake will steadily revolve, with its shaft, from a point near the inner edge of a sector-shaped platform over to the forward portion of the same, and then be made to turn upon a pivot and sweep horizontally across the said platform, and so on, by which the said rake is enabled to discharge the cut stalks of grain from the platform in compact gavels in the path that has just been passed over by the team.

Supposing the rake C to be in a horizontal position, and in the act of sweeping across the platform A, the handle S of said rake then curves upward and forward to a point a short distance above the reel-shaft R, and from that point the said handle descends vertically and is received into ears that project from the extremities of the supporter c, which embraces the reel-shaft, and is steadied in its position by means of its outwardly-projecting brace d, which also embraces the reel-shaft, but not so tightly as to prevent the said supporter from freely turning upon the reel-shaft. The two arms $g$ $g$, which project from the reel-shaft, have apertures (or journal-boxes) at their outer extremities that receive the shaft of the crank $e$. The roller $f$, which is placed upon the wrist of the crank $e$, is received into the camway between the outer and inner surfaces of the cams D and D', that are secured to the block L, which is bolted to the upright portion G of the frame of the machine. The wrist of the crank $e$ is connected to the opposite end of the supporter $c$ by means of the pitman $h$; and the outer extremity of the shaft of said crank is connected to the handle S of the rake by means of the pitman $i$ and the swivel-joints, which are combined with the extremities of said pitman, as shown in the drawings. It will therefore be perceived that this method of combining the rake-handle with the reel-shaft will cause the rotation of said shaft to impart the desired movements to the rake, and in the following manner, viz: The pivot end or straight outer extremity of the handle of the rake attains a vertical position immediately after the rake passes under the axis of the reel, and at this moment the pushing action of the arms $g$ $g$ and the pitman $i$ upon the central portion of the rake-handle causes the rake to turn upon the pivot end of said handle until it has passed beyond the inner edge of the platform A, and at that point the action of the arms $g$ $g$ on the rake-handle, through the medium of the pitman $i$, aided by the action of the said arms on the supporter $c$, through the medium of the crank $e$ and the pitman $h$, will elevate the rake and carry it steadily over and around the reel to the position for again sweeping across the platform in the before-described manner. For the purpose of giving additional steadiness and security to the movements of the rake, the roller $f$ is placed upon the wrist of the crank $e$, and the before-mentioned camway is provided to guide the movements of the said roller. The curved plates $a$ $b$, which are secured to the offset L, near the inner end of the finger-bar, receive between them the short rounded projection from the inner end of the rake during the time that the rake is passing across the platform, and by so doing relieve the apparatus which connects the rake-handle to the reel-shaft of a portion of the strain that would otherwise be exerted upon the respective parts thereof, and especially so when the machine may be operating upon a luxuriant growth of grain.

The reel of my improved harvesting-machine I shall sometimes combine with an independent shaft, which I shall locate a short distance in advance of the shaft R, and in that case the shaft R will only be made of sufficient length to enable it to be combined with my improved raking apparatus.

What I claim as my invention, and desire to secure by Letters Patent, is—

1. Combining the handle S of the rake C with the shaft R by means of the supporter $c$, the shaft-arms $g$ $g$, the crank $e$, the pitman $h$, and the pitman $i$, and in such a manner that the rotation of said shaft will steadily and positively impart the desired movements to the rake, substantially as herein set forth.

2. The combination of the cams D D' and the guides $a$ $b$, or either of them, with the above-described mechanism for operating the rake, constructed and arranged in the manner and for the purpose substantially as described.

The above specification of my improvement in harvesting-machines signed and witnessed this 12th day of April, 1859.

McCLINTOCK YOUNG, Jr.

Witnesses:
 Z. C. ROBBINS,
 J. QUINCY ADAMS.